Patented Apr. 27, 1943

2,317,671

UNITED STATES PATENT OFFICE 2,317,671

CHEMICAL COMPOUND

Oakley Ormer Cook and Claud E. Watson, Dallas, Tex., assignors of one-tenth to Albert L. Reed and Carl B. Callaway, Dallas, Tex.

No Drawing. Application June 6, 1941, Serial No. 396,938

6 Claims. (Cl. 260—387)

This invention relates to a series of new and useful chemical compounds produced by combining the metal ion of a metal element with a dye of the triphenyl-methane series.

This application is a continuation-in-part of our prior application, Serial No. 312,980, filed January 8, 1940, and entitled "Bactericide and process of making the same," relating to a new product comprising a stable solution of triphenyl-rosaniline, triphenyl-para-rosaniline, or hexa-methyl-para-rosaniline combined with an organic salt of copper such as copper acetate.

The new compounds and substances have low toxicity to body tissues and possess a high quality of stimulating the reticulo-endothelial system, the principal defense agent of the body against disease. Among other therapeutic effects these new substances possess a high penetrating effect on colloids, such as cell protoplasm, egg albumin, micro-organisms, and the wax, such as produced by and surrounding tubercle bacilli.

Other valuable effects of these products on living tissue are their anaesthetic reaction on nerve tissues and their use as a sclerosing agent in injection treatments. The compounds possess use in killing fungi found in various fungus infections of the body and in the purification of water, while their stability and solubility maintenance render them valuable in intravenous injections.

The present invention includes those products formed by combining an organic or inorganic salt of copper or other metals such as antimony, gold, silver, zinc, and mercury into stable compounds by reacting the metal ion of selected metal salt with a dye of the triphenyl-methane series. The copper salts combined with a triphenyl-methane series dye, particularly the rosaniline derivatives, when reacted in the presence of a stabilizing agent in the form of an organic acid, produce a protozoacide of great potency which has been used with remarkable success in treating and controlling malaria.

The lethal action of the compounds produced by the present invention on organisms in human and animal bodies indicates that different metal ions have selective action upon particular organisms so that one organism may be eradicated with greater ease with one particular metal ion than by another ion. For example, arsenic and mercury ions when combined into stable solutions in accordance with the instant invention appear to have great affinity for the spirochaetes of syphilis and a less affinity for the organisms of malaria and the gonococi have great affinity for the silver salts.

Fundamentally, this invention includes the preparation of organic compounds not previously known, said compounds possessing unusual bactericidal, ovacidal, fungicidal, and protozoacidal action when introduced on and into living tissue without deleterious effect thereto.

Broadly the invention includes the formation of stable chemical compounds by combining dyes of the triphenyl-methane series, particularly a rosaniline dye, with the metal ion of a metal salt of antimony, gold, silver, zinc, mercury, and copper, particularly the organic and inorganic copper salts. The metal salt may be the acetate, citrate, lactate, malate, tartrate, salicylate, formate, or sulfate.

In reacting the dye with the metal ion it is preferable to have a stabilizing agent present to assist in keeping down precipitation and to preserve the product in storage, as even small amounts of alkali from the glass of the storage containers may be detrimental. Furthermore, a stabilizing agent in the form of an organic acid which may be one of the hydroxy-acids or, specifically, lactic, acetic, tartaric, or malic acid, tends to prevent the alkali of the blood from acting too rapidly on the dye-metal molecule before the compound has sufficient time to manifest action on the serum and cell colloids. This is fundamental and thereby control of the splitting off of the metal from its conveyer is obtained.

The stabilizer also determines the hydrogen ion concentration of the product, and, although any of the organic acids mentioned is operable, the amounts used are based on the hydrogen ion concentration of lactic acid as a control.

As before stated, the several organic and inorganic salts of the metals enumerated may be used in preparing the present products, and, when using copper salts, the citrate, lactate, malate, tartrate, salicylate, formate, and sulfate forms are applicable. As a criterion, the amounts of these several salts may be proportioned to the relative amount of copper contained in each as shown by their molecular weights to supply copper equivalent to that of 0.04 gm. of copper acetate per 100 c. c. of finished product.

While inorganic salts such as copper sulfate have valuable uses, particularly for external application, the organic salts such as the acetate are preferred for intravenous application.

In making up the dye solution from the selected triphenyl-methane series dye, it is preferable to dissolve the dye in a solvent which may be one of the alcohols such as ethyl, amyl, butyl, propyl, or other higher alcohols or acetone, although for intravenous injection the alcohols are generally recommended.

As before stated, any of the dyes of the triphenyl-methane series may be used to obtain the new products and resultant benefits of this invention, particularly the rosaniline dyes and more specifically crystal violet, methyl violet B, and gentian violet. As illustrative of one detailed example of a manner of preparing one type of compound included within the broad invention, those skilled in the art are referred to the following:

Starting with crystal violet which is a pararosaniline derivative or, more particularly, a mixture of the hydrochlorides of pentamethyl-para-rosaniline and hexamethyl-para-rosaniline, a solution is prepared of approximately 1.5 grams of the compound dissolved in approximately 10.526 c. c. of alcohol (U. S. P.) and approximately 90 c. c. of water.

A solution of cupric acetate is then prepared which is composed of approximately 0.4 to 0.5 gram of the acetate dissolved in approximately 90 c. c. of water to which is added approximately 1.136 to 2 c. c. of lactic acid (85%) (U. S. P.) with sufficient water to make up 100 c. c. of solution. Thereafter approximately 8 c. c. of the copper salt solution are mixed with 90 c. c. of dye solution and the mixture is diluted to make up a unit of 100 c. c.

After allowing the mixture to stand for approximately 24 hours, it is passed under vacuum through a Berkfeld filter into a closed container. The solution is then in condition for immediate use or it may be stored and dispensed in serum bottles or ampules. It will also be understood that, if desired, the solution may be evaporated under proper conditions to form a dry crystalline powder.

What we claim is:

1. As a therapeutic product, a dye selected from the group consisting of triphenyl-rosaniline, triphenyl-para-rosaniline and hexamethyl-para-rosaniline chemically combined with the metal ion of a metal selected from the group consisting of copper, antimony, gold, silver, zinc and mercury and stabilized by an organic acid selected from the group consisting of lactic, tartaric, malic and acetic acids.

2. As a therapeutic product, a rosaniline dye dissolved in a solvent selected from the group consisting of ethyl, amyl, butyl and propyl alcohols and chemically combined with a metal salt, the solution being stabilized with an hydroxyl aliphatic acid.

3. As a non-toxic, stable therapeutic product, crystal violet dye dissolved in an alcohol and chemically combined with an organic metal salt, the product being stabilized with lactic acid.

4. As a new therapeutic product, the compound resulting from the combination of a rosaniline dye selected from the group consisting of crystal violet, methyl violet B and gentian violet dissolved in a solvent therefor and chemically combined with an organic copper salt selected from the group consisting of copper acetate, citrate, lactate, malate, tartrate, salicylate and formate and in the presence of a stabilizing agent selected from the group consisting of lactic, tartaric, malic and acetic acid.

5. A therapeutic composition produced by admixing a solution of rosaniline with a solution of copper acetate and comprising the reaction product of rosaniline and copper acetate in the approximate molecular ratio of 3.4 parts of rosaniline to .01 part of copper acetate.

6. A stable therapeutic composition of low toxicity possessing substantial protozoacidal power comprising the reaction product resulting from chemically combining a mixture of the hydrochlorides of pentamethyl-para-rosaniline and hexamethyl-para-rosaniline and an organic salt of copper and wherein the relative amount of copper present is substantially equivalent to 0.04 gm. per 100 cc. when copper acetate is used as the organic salt of copper.

OAKLEY ORMER COOK.
CLAUD E. WATSON.